(12) United States Patent
Grove et al.

(10) Patent No.: US 7,165,116 B2
(45) Date of Patent: Jan. 16, 2007

(54) METHOD FOR NETWORK DISCOVERY USING NAME SERVERS

(75) Inventors: Adam J. Grove, Menlo Park, CA (US); Michael Kharitonov, New York, NY (US); Alexei G. Tumarkin, Santa Barbara, CA (US); Cyrille Velikanov, Moscow (RU)

(73) Assignee: Netli, Inc., Mountain View, CA (US)

( * ) Notice: Subject to any disclaimer, the term of this patent is extended or adjusted under 35 U.S.C. 154(b) by 1276 days.

(21) Appl. No.: 09/903,071

(22) Filed: Jul. 10, 2001

(65) Prior Publication Data

US 2002/0059622 A1 May 16, 2002

Related U.S. Application Data

(60) Provisional application No. 60/217,082, filed on Jul. 10, 2000.

(51) Int. Cl.
*G06F 15/16* (2006.01)
*G06F 15/173* (2006.01)

(52) U.S. Cl. .................. 709/245; 709/203; 709/223

(58) Field of Classification Search ........ 709/200–207, 709/217–232, 245–250, 236–238; 719/310–318; 717/100, 102–105; 455/453
See application file for complete search history.

(56) References Cited

U.S. PATENT DOCUMENTS

| | | | |
|---|---|---|---|
| 5,835,720 | A | 11/1998 | Nelson et al. |
| 6,014,660 | A | 1/2000 | Lim et al. |
| 6,052,718 | A | 4/2000 | Gifford |
| 6,092,178 | A | 7/2000 | Jindal et al. |
| 6,138,162 | A | 10/2000 | Pistriotto et al. |
| 6,182,139 | B1 | 1/2001 | Brendel |
| 6,195,706 | B1 | 2/2001 | Scott |
| 6,205,477 | B1 | 3/2001 | Johnson et al. |
| 6,279,038 | B1 * | 8/2001 | Hogan et al. ............... 709/224 |
| 6,286,047 | B1 * | 9/2001 | Ramanathan et al. ....... 709/224 |
| 6,333,932 | B1 * | 12/2001 | Kobayasi et al. ........... 370/389 |
| 6,405,252 | B1 * | 6/2002 | Gupta et al. ................ 709/224 |

(Continued)

*Primary Examiner*—John Follansbee
*Assistant Examiner*—Haresh Patel
(74) *Attorney, Agent, or Firm*—White & Case, LLP (57) ABSTRACT

The invention provides a method and a system for associating the IP address of a client within a computer network with the address of the client's local domain name system (LDNS) server ("network discovery" function), and may furthermore use this association to provide such functions as network proximity analysis and load balancing. When a client's LDNS server queries the authoritative DNS (ADNS) server about an IP address of an application server, a name server monitor (NSM) of that ADNS server returns an IP address of an application server monitor (ASM) of the appropriate application server, instead of the address of the server itself, and records the IP address of the querying LDNS server, the ASM address returned, and a timestamp. When the ASM of the application server receives a request for web content from the client, it records the IP address of the client and a timestamp, with possibly other pertinent information (round-trip time, bandwidth estimate, etc.), and forwards the request to the application server. Both the NSM and the ASM then send their respective records to a Discovery and Monitoring Manager (DMM). The DMM finds matching pairs of those records and thus discovers LDNS-to-client associations. In addition to network discovery, a system according to the present invention has the ability to collect information about the state of the network between clients and servers, for its further storage and analysis on a per LDNS server basis.

20 Claims, 3 Drawing Sheets

U.S. PATENT DOCUMENTS

| | | | |
|---|---|---|---|
| 6,425,003 B1* | 7/2002 | Herzog et al. | 709/223 |
| 6,484,143 B1* | 11/2002 | Swildens et al. | 705/1 |
| 6,694,358 B1* | 2/2004 | Swildens et al. | 709/218 |
| 2001/0047415 A1* | 11/2001 | Skene et al. | 709/226 |
| 2001/0054020 A1* | 12/2001 | Barth et al. | 705/37 |
| 2003/0074471 A1* | 4/2003 | Anderson et al. | 709/245 |
| 2004/0078490 A1* | 4/2004 | Anderson et al. | 709/245 |
| 2005/0033858 A1* | 2/2005 | Swildens et al. | 709/232 |

* cited by examiner

METHOD FOR NETWORK DISCOVERY USING NAME SERVERS

CROSS-REFERENCE TO RELATED APPLICATIONS

This application claims the benefit of the filing date of U.S. Provisional Application Ser. No. 60/217,082 filed Jul. 10, 2000.

FIELD OF INVENTION

The present invention relates to performance enhancements for distributed application servers, such as Internet Web servers.

BACKGROUND OF THE INVENTION

There is an acknowledged need to improve Internet performance, by distributing or replicating some of the functions of an application server (such as a Web server) across multiple locations. Ideally, a client should receive services from the closest server (in network terms). Other parameters such as the current load and the maximum capacity of each server, as well as the current network load conditions, may also be important.

A common way of directing the client to the server it should use is based upon a directory service or name service, of which the most common and important today is the Domain Name System (DNS). To facilitate understanding of the subsequent description, the next subsection contains a brief introduction into DNS fundamentals. Detailed DNS specifications may be found in the Internet Engineering Task Force (IETF) rfc1034/1035 documents. See www.Internet-Standard.com. Following the description of the DNS fundamentals, we describe the more specific context in which our present invention is intended to solve problems for which the prior art does not provide satisfactory solution.

Domain Name System Fundamentals

Consider an example: a client wishes to access a Web Server named "site.com". It starts then with issuing a query to a DNS server asking to have the name "site.com" translated into a network address. Today, a network address is typically an Internet Protocol (IP) address which is a unique 32-bit number. This translation process is usually called name resolution. We call the DNS server or servers (or other such name servers) contacted by the client the client's local DNS (LDNS) server. A LDNS server, which is often on the client's corporate premises or at his ISP, may need to query yet other name servers in order to find the requested IP address. Ultimately, this resolution query process stops at an authoritative DNS (ADNS) server for "site.com", which is a name server that is configured so that it always contains at least one valid IP address corresponding to "site.com". The ADNS server then responds to the LDNS server, and the LDNS server finally responds to the client, giving an answer to the query it initially received from that client.

Some further remarks about the Domain Name System terminology and principles will be of use to the reader. First, we should mention that the term "ADNS" relates to a given site name (or several site names) for which this DNS server is authoritative. Similarly, the term "LDNS" relates to a "population of clients" which are using a particular DNS server as their local name server. On the other side, DNS servers used as ADNS servers and those playing an LDNS server role differ in their mode of operation. Therefore it makes sense to use both terms in an absolute and not only relative way. Sometimes however a DNS server may play an LDNS server role for some clients and at the same time be an ADNS server for some site names. When we consider such a name server an LDNS server, we simply refer to one specific role of that name server. There exist also "name server roles" other than ADNS server and LDNS server, but they are of no relevance to the present invention.

An important fact about the Domain Name System is that a DNS server receiving a query may only identify the "immediate source" of the query. In this way, an LDNS server queried by a client knows the IP address of the client; but any other DNS server, including the ADNS server, when queried by an LDNS server knows only the IP address of that LDNS server, and not the address of the client who has provoked this query from the LDNS server to the ADNS as a result of its "initial query" to the LDNS server.

For this reason we will never use in the subsequent text the term "client" to signify the source of a query, when the query responder is not an LDNS server. Thus, the source of a query to an LDNS server is some client, and the source of a query to an ADNS server is some LDNS server. The term "client" will be exclusively used to designate an entity which first interacts with its LDNS server to get an address of a site, and then interacts with the application server whose address has been returned by the LDNS server, and which is deemed to provide the services of that site. Typically, such an entity is a computer equipped with a "resolver" program for interacting with its LDNS server, which is called upon by a "browser" program intended to interact with Web-sites.

Another fact that is important for our subsequent considerations is that a DNS server, and more specifically an LDNS server, while receiving from another DNS server an answer bearing some name-to-address resolution record, may decide to store that record in its local memory called "cache", for a time interval (validity time, also called "time to live", or TTL) which is also supplied with the record in the answer. During that time interval, the DNS server, while answering all subsequent queries about the same name, will use the cached information instead of repeating its own "upstream" queries. After the TTL of that record expires, the DNS server will "refresh" the information, by re-issuing an upstream query. Eventually it may receive an answer different from the answer that was previously received and cached.

Load Distribution Using Source-Sensitive ADNS Server

The authoritative DNS server for "site.com" may, in fact, have several different addresses corresponding to more than one location, server, or proxy, that are all capable in principle of providing site.com's service. The ADNS server may then choose, among these possibilities, a subset of one or more such locations that are deemed to be the most suitable in the scope of one specific query. The choice can be made based on network proximity (e.g. how close the client is believed to be to each server), communication cost, quality-of-service considerations, load on each server, and other such factors. Some of these factors (such as the total load on each given server) may be learned by the ADNS server directly from the servers because they are client-independent. For example, U.S. Pat. No. 6,205,477 describes a DNS-based method for load distribution according to pre-defined load metrics for all servers. But many other parameters (such as network distance and load along the path from the client to the server) vary from client to client and thus would appear to require that the ADNS server be able to identify the client who issued the query. The present invention mainly addresses load distribution techniques based on client-dependent parameters. The "network distance" between a client and a server is the most important among those parameters.

Identifying the client who originated a query received by an ADNS server is, however, a difficult task within the scope of the DNS standard to which the presently deployed Internet name service adheres. The problem lies in the above mentioned "two-level" DNS address resolution mechanism: the client queries its LDNS server, rather than an ADNS server, and the LDNS server then issues another query to an ADNS server (with possibly some preparative queries to locate that ADNS itself). When the ADNS server receives a query, it learns only the address of the issuing LDNS server and not the address of the client that issued the "initial" query. This is significant, because one may wish to design the ADNS server to choose a server that is close to the client or stands in some other particular relation to the client. However, since the ADNS server does not learn the name or address of the client, it can only choose a server that is close to the client's LDNS server instead. Since any client is usually configured to use an LDNS server fairly close to the client itself, it may be a reasonable heuristic to base the decision on the LDNS server rather than the client. However, the adequacy of this heuristic varies from situation to situation, and this may be considered as an intrinsic deficiency of such a "per LDNS server redirection method".

The above mentioned specific behavior of an ADNS server, making the content of its answer to a query depend on the query's source, is not implemented in the most popular DNS server realizations, which are programmed to answer queries in a "source-independent" manner. Nevertheless, such a source-sensitive ADNS server may easily be designed and integrated into existing Internet network, without disturbing the normal operation of other network components, which would not even notice this specific behavior of the ADNS server. In the subsequent considerations, the term "ADNS" includes such a source-sensitive authoritative name server. Load distribution systems based on source-sensitive ADNS server behavior exist in prior art, and are often termed "DNS-based redirection systems".

Different Approaches to Network Discovery

In order for a DNS-based redirection system to become operational, one must implement yet another system, either stand-alone or integrated with the redirection mechanism, for performing a task that is usually called network discovery. This task consists in collecting and analyzing information about the network proximity between clients, servers, LDNS servers and ADNS servers. Such information and analysis are needed by the ADNS server in order to choose the correct server(s) in each case.

Different approaches to network discovery may a priori be classified in the following way. We have four main types of network components potentially participating in the discovery process: on one side, clients and application servers (such as Web servers or proxies), on the other side LDNS servers and ADNS servers. Clients send requests to servers, and also send queries to LDNS servers; LDNS servers send further queries to ADNS servers. Client programs (browsers, resolvers etc.) may easily be modified or appended in a way to collect and analyze network distance information, e.g., in the form of round trip time, (RTT) on connections they establish with servers. Clients then may use that information themselves to select the best server or pass it to another network component. We call this group of network discovery methods client-cooperative, because it involves active cooperation of clients, which must run modified or supplemented versions of their programs.

One example of such client-cooperative methods is described in U.S. Pat. No. 6,182,139. A client-side located mechanism for best server selection, which operates on the whole list of server addresses as received from the ADNS server. The ADNS server itself may remain "client-independent".

This whole group of discovery and redirection methods, however, addresses one specific business model for Internet access acceleration, which involves distribution of specific software to the client community and its wide acceptance by the latter. Clients should be ready to install that software, and eventually pay for it. In contrast, we are mostly interested in providing network discovery and redirection methods "invisible" to clients, by modifying application servers and ADNS servers, or by installing specific modules intended to alter external behavior of those otherwise standard servers. Clients and their LDNS servers should not be modified at all. Such a server-based, client-transparent approach adheres to another business model, largely preferred by the community of Web-service providers.

Another approach to network discovery takes advantage of the fact that the server is also able to measure the RTT along a network connection and thus can collect and sort out network proximity data. Even in the absence of any connection, e.g. when communication is using connectionless UDP protocol, the server typically is still able to measure RTT by sending a special ping packet to the client, or, better, a series of such pings. The latter method may be called active, as opposed to the passive TCP-based method, because it performs measurements at any time when decided by the server, and does it by sending extra packets otherwise absolutely unnecessary for normal interaction between the server and its clients. The active method may also be used between network nodes which otherwise are not communicating at all, e.g. a Web server node may ping an LDNS server.

An example of an enhanced ping algorithm is found in U.S. Pat. No. 5,835,720. Generally speaking, ping is only an example of the active method, and TCP RTT measurement only an example of the passive one. The conceptual difference between these two methods is that the active method creates extra communications unnecessary for the applications it intends to serve, while the passive method does not create extra communications. We should also note that a sole ping message to a given IP address does not provide sufficiently reliable information on network distance to that address, because of possibly significant network delay variations. Thus, a whole series of consecutive pings is typically necessary. This may be considered a serious drawback of the active method, as it creates undesirable traffic and may even cause supplementary delay for application traffic itself, which it intends to accelerate.

Another and perhaps even more important drawback of the active method lies in its assumption that the addressee of a ping (or of any other unsolicited packet or message) would reply. This is not always true. An Internet-connected device could drop ping packets received in what it considers to be a heavy load condition. While this may be a temporary problem, for which a solution is to simply repeat pinging at off-peak hours, there is a much more serious problem. An ever increasing number of Internet-connected devices "hide" themselves, for security reasons behind the so-called "firewalls", or otherwise protect themselves, by filtering out non-solicited incoming packets, including ping packets. This is specifically true for client-side devices, such as individual client computers, corporate local networks or intranets, and also privately run LDNS servers. Even if a client-side device is initially "ping-responsive", it may later become "ping-rejecting", specifically because it may have considered itself as being "attacked" by repetitive pings from the same address. Hence the active method may give only partial results for network discovery.

Continuing with our review of current and possible network discovery methods, we observe that measuring (application-)server-to-client distance brings no help to DNS-based redirection, unless we have also learned which LDNS server a client is assigned to. The ADNS server knows nothing about clients, and the application server knows nothing about LDNS servers. One possible solution consists in measuring distances between application servers and LDNS servers, considering that those distances approximate the real distances between the application servers and their clients. Note that this may only be done using an active method since application servers and LDNS servers do not normally communicate at all. Such an approach suffers both from the general drawback of any active method (network pollution) and from a specific drawback of metering possibly irrelevant information—the distance between nodes that are not intended to communicate.

Problems and Needs Addressed by the Present Invention

There is, therefore, a need for a network discovery mechanism for collecting information about relationships between clients and their assigned LDNS servers, such a mechanism being transparent for both clients and LDNS servers, i.e. requiring no modifications to their installed software.

There is a further need for such a mechanism to be passive, that is, creating no extra communications for its operation, especially along network paths leading to clients or to their LDNS servers.

There is also a need for a network distance measuring mechanism, such a mechanism applying a passive approach, and, when used in conjunction with the above passive network discovery mechanism, collecting network distance metrics between a given server and clients assigned to a given LDNS server, in order to obtain an aggregate distance characteristic for the whole population of the users of that LDNS server, instead of metering the possibly irrelevant distance to the LDNS server itself. A passive measurement mechanism of the same type is also needed for metering other client-to-server communication parameters, such as network load or packet loss rate, and assigning aggregate values of those parameters to LDNS servers.

Finally, there is a need for a complete system providing for optimal distribution of client requests (load balancing) among geographically distributed servers, with their subsequent redistribution as a function of changing network load conditions, making use of client-transparent passive network discovery and measurement mechanisms. Existing load balancing systems are based on active and/or client-cooperative approach to network discovery, measurement and monitoring, and therefore do not satisfy the above formulated requirements.

The present invention addresses all these needs.

SUMMARY OF THE INVENTION

The present invention, firstly, discloses a novel method for passive client-transparent network discovery and a system operating with accordance to said method.

In a preferred embodiment, the method of the invention comprises:

recording certain information concerning a query received by an ADNS server and an answer sent by the ADNS server to a source of query, said information including an identifier of the site to which the query was directed, an address of the LDNS server from which the query was received, and a timestamp;

recording certain information concerning connection requests or subsequent data packets received at a second server, said information including some or all of: an identifier of the second server, the requesting client's address, and a timestamp;

finding pairs of matching records among those produced by both the ADNS server and the second server, the match being defined as the same identifier for the site queried for and the second server, and the timestamp of the client's request being within some validity period after the timestamp of the query answer; and from every matching pair of records obtaining an association between an LDNS server and a client.

Said discovery and monitoring system of the present invention comprises specific network components, cooperating between them and with the above cited Internet components. In a preferred embodiment, specific network components include:

one or several application server monitors (ASMs), each ASM being associated with at least one application server;

one or several name server monitors (NSMs), each NSM being associated with at least one ADNS;

and one or several discovery and monitoring managers (DMMs), each DMM communicating with one or several ASMs and with one or several NSMs for the purpose of collaboratively discovering associations between clients and their respective LDNSes by correlating some of the queries from LDNSes to ADNSes with some of the requests for service from clients to application servers.

The role of an ASM associated with an application server, e.g. with a Web proxy server, consists in recording characteristic parameters of communications between that server and some of its clients, and making available the recorded information to a DMM.

The role of an NSM associated with an ADNS consists in modifying some of the answers being sent by that ADNS back to LDNSes having queried it, by replacing an application server address, being returned by the ADNS, with some monitoring address, causing subsequent requests to that application server (from clients associated with that LDNS) to arrive at that monitoring address and be viewed by the ASM associated with that application server. An NSM records characteristic parameters of such an answer, and makes available the recorded information to a DMM. Typically, every NSM reports to one specific DMM.

The role of a DMM is to correlate information received from ASMs and from NSMs and to deduce assignment relations (associations) between LDNSes and clients. A DMM may also instruct ASMs and NSMs to perform their above sited actions on certain specific queries and on certain specific requests.

The present invention also comprises a novel method, and a system based on it, for calculating an aggregate proximity metric (or other appropriate characteristics such as bandwidth, packet drop rate etc.) between an application server and a population of clients associated with a given LDNS. Again, this is achieved in a passive and client-transparent way.

A preferred method comprises:

recording network distance characteristics (or other measurable characteristics as needed) for individual clients communicating with a given application server;

sorting the recorded data into per LDNS collections; and calculating aggregate characteristics for every LDNS by applying to the collection of records relating to that LDNS any appropriate method of statistical averaging.

Said sorting of records is made possible by applying the network discovery method according to the present invention. The process of collecting and sorting said records for a given LDNS may be done simultaneously with that LDNS exploration according to said network discovery method; or, it may be done at a later stage, by recording and sorting characteristics of those clients whose associations with the LDNS have already been discovered.

A system for calculating aggregate LDNS characteristics according to the present invention may have basically the same structure as our network discovery system, with every ASM being additionally charged with recording appropriate characteristics of clients' communications with an application server. For that purpose, the ASM should preferably be co-located with the application server it is associated with, or otherwise be able to record communication characteristics comparable with the same characteristics being read at the server location.

Finally, the present invention comprises a novel method for dynamic load distribution and balancing among several, possibly geographically dispersed, application servers. A preferred embodiment of the method comprises the steps of:

discovering and collecting client-to-LDNS associations according to the first aspect of the invention, dynamically measuring appropriate characteristics of client-to-server connections, and calculating per-LDNS aggregate values of those characteristics according to the second aspect of the invention, and finally, instructing an ADNS server to answer queries from LDNS servers in a way for their clients to be directed, at any moment of time, to the best performing application servers, with accordance to the most recently measured and calculated values of communication characteristics.

BRIEF DESCRIPTION OF THE DRAWING

These and other objects, features and advantages of the invention will be more readily apparent from the following Detailed Description of Preferred Embodiments in which.

DETAILED DESCRIPTION OF PREFERRED EMBODIMENTS

Common Characteristics of the Preferred Embodiments

Figure 1:
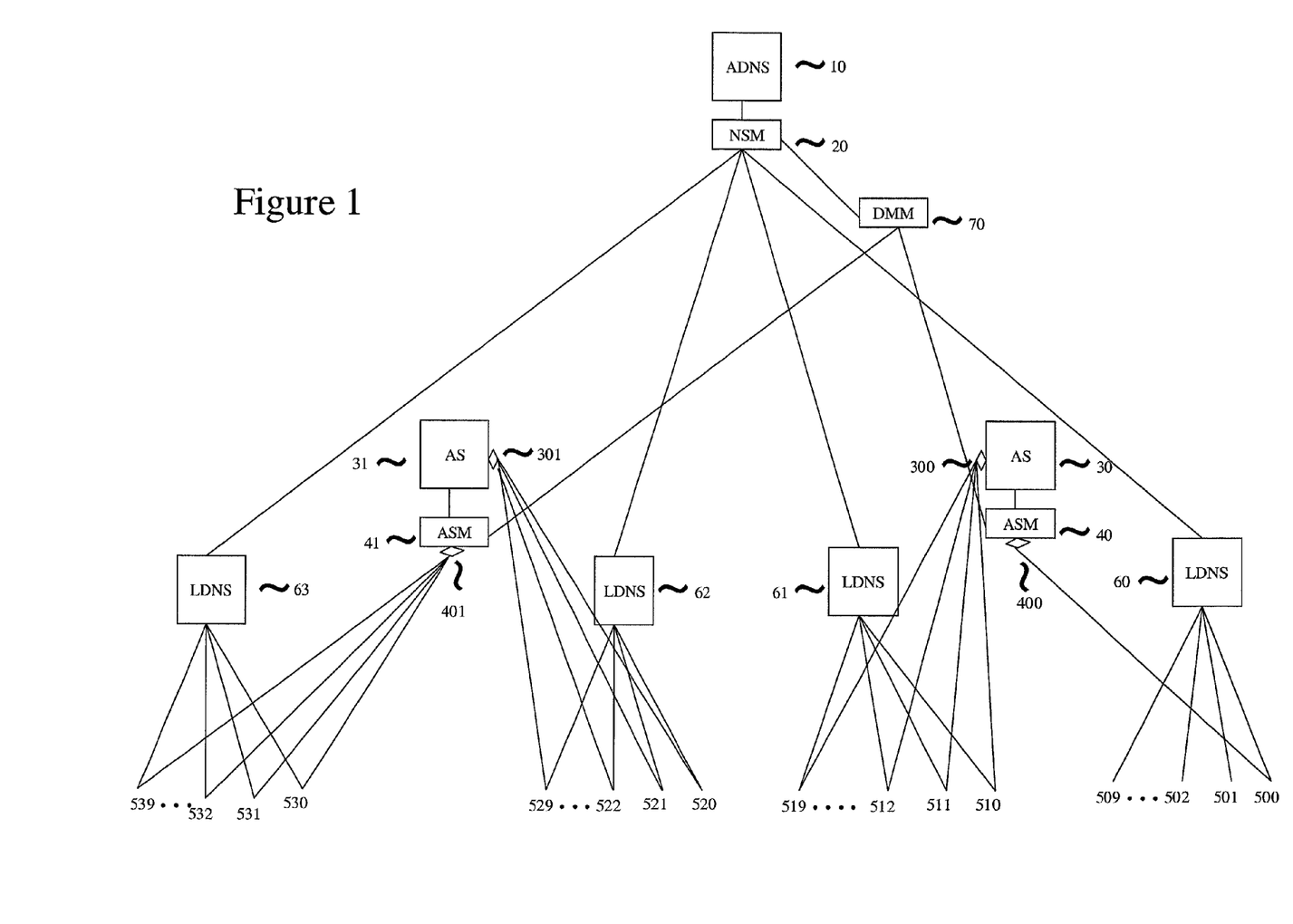
FIG. 1 is a schematic illustration of a network of clients, servers, LDNS servers and ADNS servers according to a first embodiment of the invention.
Figure 2:
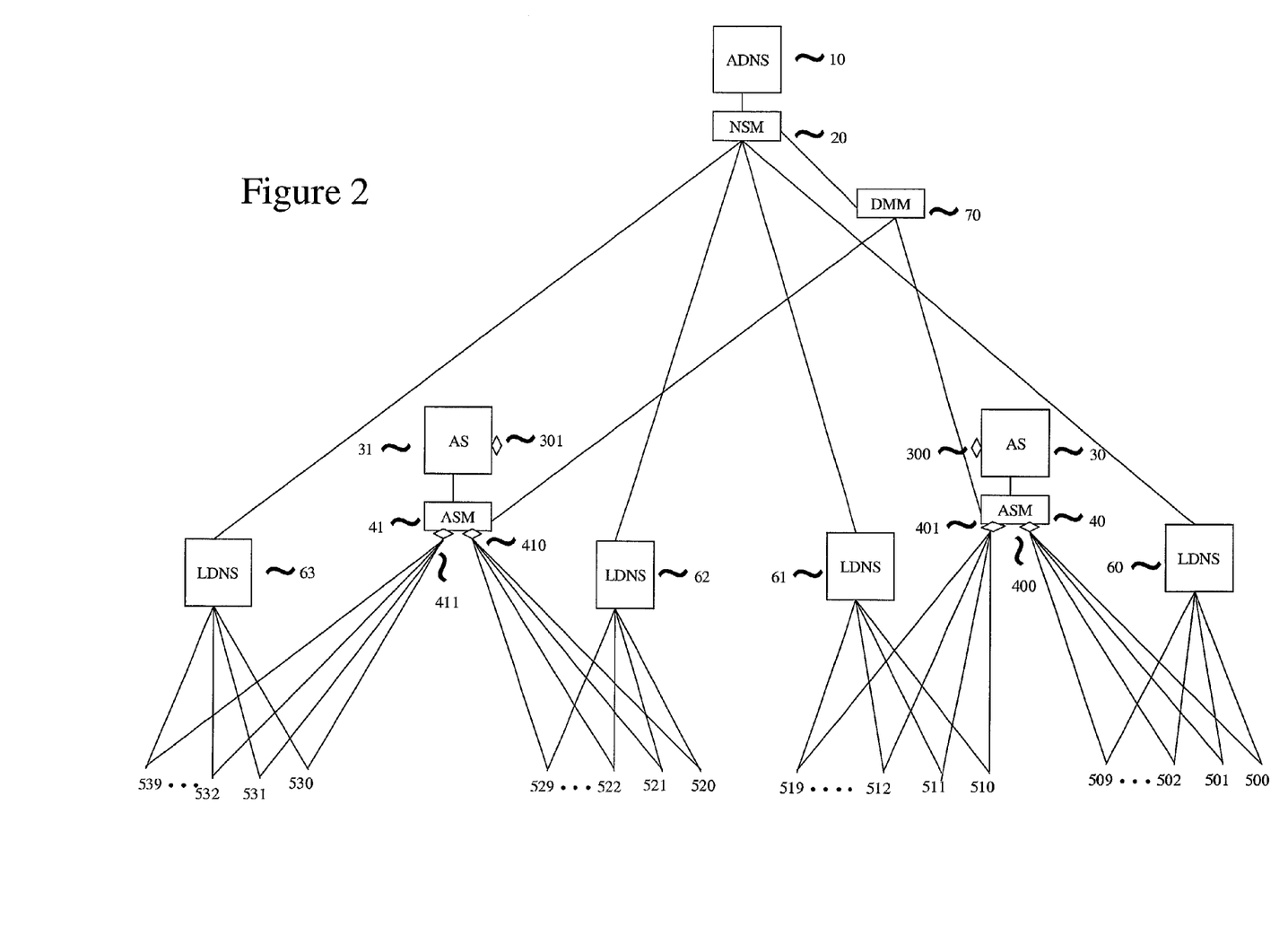
FIG. 2 is a schematic illustration of a network of clients, servers, LDNS servers and ADNS servers according to a second embodiment of the invention.
Figure 3:
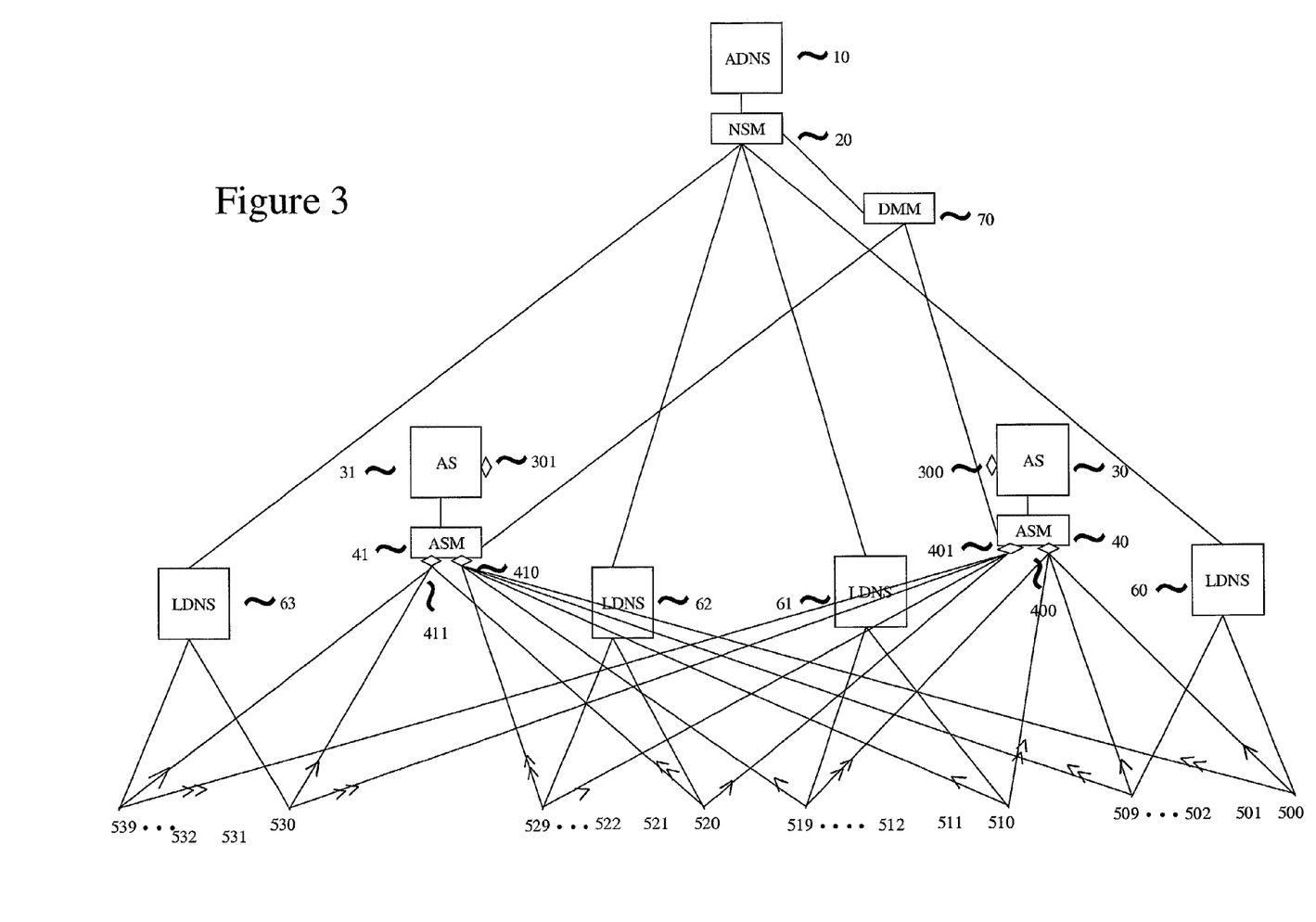
FIG. 3 a schematic illustration of a network of clients, servers, LDNS servers and ADNS servers according to another embodiment of the invention.

Each of FIGS. 1, 2 and 3 shows a system comprising a plurality of groups of clients 500–509, 510–519, . . . , a plurality of LDNS servers 60, 61 . . . and an ADNS server 10. Each group of clients queries its own LDNS server 60, 61, . . . , respectively. LDNS servers further query a "source-sensitive" ADNS 10 authoritative for some site name, say www.site.com. Also shown in FIG. 1 are application (or web) servers 30, 31 having standard addresses 300, 310 respectively, and "monitoring addresses" 400, 410, respectively. The particular numbers of clients, application servers, LDNS servers and ADNS servers are only illustrative.

All the preferred embodiments of the present invention as hereafter described deal with a network operating according to Internet standards, either an Intranet or a fragment of the worldwide Internet. Furthermore, as application servers we consider the well-known Web-servers, communicating with their clients using the standard HTTP protocol, or Web proxy servers, each providing services of one or several Web-sites. In our descriptions of preferred embodiments we will denote sample web sites by www.site.com, www.site1.com etc. Obviously, our invention may also be practiced using web sites belonging to other root domains such as "org", ".uk" etc.

Furthermore, for every application server 30 (e.g., a Web-server or a Web-proxy) there is exactly one co-located application server monitor (ASM 40, 41) and for every ADNS server there is exactly one name server monitor (NSM 20). There is also a discovery and monitoring manager (DMM 70) connected to the ASMs and NSMs. The ASMs, NSMs and DDM are components of a network discovery and monitoring system according to the present invention, and the way they operate is hereafter described in full detail. By "co-located components" we understand "components located in the same network node", in a way that they are "sensibly at the same network distance from any other network node". This latter definition, which is broader than the general meaning of the term "co-located", may be equally well applied throughout the subsequent description.

Physically, co-located components may be interconnected by a local area network, or be located on the same computer machine as two separate processes, or even represent different functions within one and the same application process. The description of all embodiments hereafter applies equally well to any realization of the co-location principle.

All of the hereafter described embodiments operate in a standard Internet context of a plurality of clients 500 . . . 539 and a plurality of LDNS servers 60, 61, 62 and 63. According to a common and well-known Internet practice, every client sends all its DNS queries most of the time to one and the same LDNS server, which may then be considered as "assigned" to that client. E.g., LDNS server 60 may be assigned to client 500 as well as to many other clients. We will also say that the client 500 is "assigned to", or "associated with" LDNS server 60. Some other LDNS servers (one or more) may also be assigned to the same client for redundancy purposes. A client will query its secondary LDNS server only if the primary server does not respond to a query.

One of the main purposes of our invention is to discover these client-to-LDNS server associations or assignments, which are not known in advance either to web servers or to ADNS servers.

The First Preferred Embodiment

In a simple embodiment, as exemplified on the FIG. 1, a single ADNS server 10 and one or several application servers 30, 31, . . . , each hosts the same web site "www.site.com" (or is a proxy server for that site, or provides a caching proxy service for it). Every web server 30, 31 has a single IP address 300, 301, which we will call its standard address.

E.g. the server 30 has a standard address 300. There is a single ASM 40, 41, co-located with each web server 30, 31 but having a different IP address (4x0) called a monitoring address for the web server (3x). E.g., the server 30 has a monitoring address 400 which is the address of its co-located ASM 40. There is also a single NSM 20 co-located with the ADNS server 10, and a DMM 70 to correlate data received from both the NSM and the ASMs, and to instruct them to perform the network discovery and monitoring tasks. These main network components are surrounded by a plurality of clients (5xy) and a plurality of LDNS servers (6x).

When a client, say 500, requests a web object from www.site.com, the client's browser queries its LDNS server 60 for the IP address of www.site.com. If the LDNS server 60 doesn't have that information in its local cache, it sends a further query to a DNS server which is authoritative for www.site.com. In our case, we assume that it will send the query to the ADNS server 10, because it has previously found and cached a referral to this ADNS server, according to the general and well-known DNS referral mechanism.

Under a conventional procedure, ADNS server 10 would return the regular IP address 300 to the client's LDNS server 60, which will pass this IP address to the client 500. The client now will contact the server 30 using the regular IP address 300. Therefore, in a conventional DNS procedure, when all clients are using the same regular IP address 300 of the server, the web server 30 has no information on the IP address of the client's LDNS server 60, while the ADNS server 10 has no way of learning about the client's IP address.

Having an additional monitoring address 400 for the web server 30 makes it possible to associate clients with their LDNS servers (or, more precisely, to discover existing associations between them) in a way that is described hereafter. When ADNS server 10 receives a request for the address of www.site.com from an LDNS server 60, its NSM 20 replaces the standard address 300 of the web server 30 with its monitoring address 400 in the response sent by the ADNS server 10 back to the LDNS server 60. The NSM 20 then records the standard address (or other unique identifier) of the web server object of the query, the IP address of the LDNS server and the time when the response was sent to it ("a response timestamp"), with possibly some additional information as will be described in other embodiments. All this information constitutes a query record.

The LDNS server 60 passes the monitoring address 400 back to the client 500 as the address of the web server 30. The client 500 now contacts the server 30 using the monitoring address 400. As the monitoring address 400 is the IP address of the ASM 40 co-located with the server 30, and not the IP address of the server 30 itself, a request from the client 500 will first arrive at the ASM 40. The ASM records the IP address of the requesting client 500 and the timestamp of the request, with possibly some additional information as will be described in other embodiments. All this information constitutes a request record. The ASM forwards the request to the web server 30. Replies from the server 30 also pass through its co-located ASM 40, which replaces the server's address 300 with its own address 400, and may also pick up and record some additional information concerning the client-to server communication, as will be described later.

The NSM 20 sends all the "query records" to the DMM, and every ASM, in particular the ASM 40, sends all the "request records" to the DMM as well, with the web-server's standard address (or other unique identifier) appended to each such record. The DMM, by comparing the web server's address and the timestamp fields in the query records and in the request records received, finds matching pairs of records (the timestamp of a request record will indicate a later time than the timestamp of the corresponding query record, but it shall be within the TTL period after the timestamp of the query record) and from each matching pair of records discovers associations of the type "client 500-LDNS server 60".

Now we shall consider the fact that every name-to-address resolution record, returned by a DNS server and in particular by an ADNS server, has a validity period parameter commonly called TTL (time to live), either explicitly defined or set by default. Though an LDNS server receiving such a record may unilaterally augment its TTL, and so may the client's browser, we know however some practical framework for TTL handling. Namely, if the TTL in a response from an ADNS server to a LDNS server is set to 0, then the LDNS server typically sets it to 5 minutes maximum. How the browser expands TTLs is irrelevant to our purposes, provided that each ASM maintains a list of all client IP addresses which it had already seen; then the ASM will be able to filter out all those clients that eventually continue to use the ASM's monitoring address even after the TTL as set by the ADNS server, and possibly augmented by the LDNS server, has expired. So, all the clients which are new for the given ASM 40, i.e. whose IP-addresses haven't yet been seen by it, and appear within the TTL set by the NSM 20 in its response to the LDNS server 60, properly augmented to become 5 minutes maximum, necessarily are the clients associated with the same LDNS server 60.

Reasoning in this way, we may either set the TTL in replies from NSM 20 to LDNS server 60 to a short value (0 to 5 minutes), expecting to catch just few new clients during this time interval, and then, after expiration of this TTL (plus some security gap, say, 1 minute) reattribute the same monitoring address 400 to another LDNS server with its clients. Or, we can assign the same monitoring address 400 to one given LDNS server 60 for a much longer period (say, 24 hours) in order to discover a majority of that LDNS server's clients.

Variants and Modifications of the First Preferred Embodiment

In this subsection we describe some options or variants of the first preferred embodiment. The list is by no means exhaustive, and those of ordinary skill in the art may easily devise more variants, add or remove unimportant details, or apply the whole embodiment in another but similar context.

First, we have three alternative ways to confront the information separately stored in the NSM 20 and in the ASM 40, and consequently three different variants of this first embodiment of our invention. Namely:

(A) We may have a DMM (discovery and monitoring manager) 70 distinct from any ASM or NSM and known to all of them (as depicted on FIG. 1).

(B) We may have a DMM co-located and even integrated with the NSM. Then every ASM should simply send all the request records to the NSM which handles them as does DMM in (a) above.

(C) As a third alternative, we may have a separate DMM for every ASM, co-located and even integrated with it. Then every NSM sends every query record to that ASM which is co-located with the web server object of the query, and the ASM proceeds as DMM in (a) above. Every ASM then should communicate with the NSM in order to manage the whole network discovery procedure.

The choice among the above three options depends on what we intend to do with the discovery information thus obtained. Option (b) is however preferable for those applications we are primarily aimed at, namely in DNS-based redirection and load balancing of client requests.

Second, our described design does not require the ASM to have a separate "monitoring address" at which it is substituting itself for the real application server while forwarding client requests to the latter. Another equally practical implementation may have the monitoring address (or all the monitoring addresses, if there are several as in the second embodiment) be just part of the application server's addresses, while the application server's standard addresses (one or more) are the other part. The ASM then would transparently monitor communications either on all the server's addresses or on the monitoring ones only, for example in a so called "sniffer" mode.

Furthermore, one can easily observe that the application server may be identified, in both the query record and the request record, by its monitoring address instead of its standard address, as every IP address used as a monitoring address may be assigned to one application server only. Using monitoring addresses in query records and in request records is an option for the first preferred embodiment, but becomes mandatory when multiple monitoring addresses are used for the same application server, as in the second preferred embodiment described hereafter.

Yet another group of variants may concern interactions between NSM and its ADNS server. We have described the NSM as "sitting in front of" the ADNS server and modifying answers prepared by the latter. In this way we can imagine using our novel NSM component with some known ADNS server, by clearly separating the novel functions of the NSM from known functions of the latter. But we can alternatively design an integrated NSM-incorporating ADNS server, or else, consider an NSM which is permanently updating an internal ADNS server database in a way for the ADNS server to answer any query with a server address already chosen according to the method of the present invention, while the method itself is implemented within the NSM and not the ADNS server.

These and many other variations may be applied to other embodiments, and in particular to the embodiments described hereafter, and they are all fully covered by the present invention.

The Second Preferred Embodiment: Using Several Monitoring Addresses of the Same Server The above-described first embodiment may be further enhanced in different ways. We start by assuming, that for some or all of the web servers (3x) their co-located ASMs (4x) each have more than one IP address, as depicted on FIG. 2. E.g., ASM 40 has IP addresses 400, 401, . . . All these addresses are therefore monitoring addresses for the same web server 30. This gives us the possibility of simultaneously exploring several different LDNS servers, by responding to their queries with different monitoring addresses for the same web server.

In more detail, suppose that at some moment t the ADNS 10 is queried by an LDNS 60 about the address of www.site.com, and returns the standard address 300 of the web server 30, which is then replaced by its monitoring address 400. The ASM 40 starts discovering clients 500, 501, . . . assigned to the LDNS 60, as soon as they send their requests for www.site.com, arrive at the monitoring address 400. For every such request captured by the ASM 40, this ASM and the NSM 20 proceed as described for the first embodiment, with only one difference: both the NSM and the ASM must also record, and then send to the DMM, the specific monitoring address being used (along with other information constituting query records and request records respectively).

Now suppose that shortly after the query from the LDNS server 60 has been handled by the ADNS server 10 and its NSM 20, there is another query concerning the same www.site.com, but from a different LDNS server 61. "Shortly after" means here "before the TTL expiration". We want to explore this second LDNS server as well, but the monitoring address 400 is still being used to explore the LDNS server 60. The NSM 20 responds then with another monitoring address, say 401, of the same web server 30, and the ASM 40 starts exploring the LDNS server 61 at its address 401 in parallel with exploring the LDNS server 60 at the address 400. To find out the matching pairs <query record, request record>, the DMM then checks not only the standard address (or other unique identifier) of the web server, but also the monitoring address being used.

In this way, the NSM 20 may simultaneously explore as many LDNS servers, that submit queries about www.site.com and are directed to the same web server 30, as there are different monitoring addresses defined for that web server 30. If, say, there are 10 such addresses, and each one is allocated every 6 minutes to a different LDNS server, then one NSM may explore up to 100 LDNS servers in one hour. To do that, the NSM or the DMM should maintain a "monitoring addresses occupancy table", so that a "free" monitoring address may be found by looking through that table.

The method also comprises arrangements for recognizing requests from clients associated with one given LDNS server (namely, from that LDNS server which had issued the query to the ADNS server not earlier than within said validity period before the request's reception at the server location) among all other requests to the same server. These arrangements may consist in some of the following:

answering queries from different LDNS servers with different addresses of the same server;

answering with a previously used server address only after the TTL (time to live) of the previous answer with that server address has expired (that address being considered "busy" until the TTL expires);

having at least one "standard" address of the server, with which the ADNS server would answer queries received while all the server addresses used for client discovery are busy;

maintaining the list of all clients already discovered, in order to filter out possible "late requests" from clients associated to LDNS servers which had been already explored during previous time intervals.

In the subsequent description, the process of discovering and collecting client-to-LDNS associations for a given LDNS server will also be called exploration of that LDNS. Exploration of an LDNS may be done in a single time interval, but it may also be complemented from time to time in a similar way by appending newly discovered associations to those already collected. Such an iterative approach may be specifically reasonable because many clients associated with an LDNS server being explored would not manifest themselves during the first time interval.

The above method may in particular be implemented by building a discovery and monitoring system that operates in a context of Internet network comprising, in particular, components of the following standard or known types:

application servers (typically, Web servers, Web proxies, Web caches, etc);

LDNS servers;

clients, querying those LDNS servers for the address of any among the application servers providing a service whose name is specified in the query, and then requesting provision of that service from the application server whose address has been supplied in the response from that LDNS server;

and one or several authoritative DNS servers (ADNS servers), answering name-to-address resolution queries from LDNS servers which act on behalf of their associated clients, some or all of said ADNS servers being possibly of a source-sensitive type, that is, answering LDNS servers in a way that the content of every answer is potentially dependent on the LDNS server which issued the query;

The Third Preferred Embodiment: Passive Distance Measuring, LDNS Exploration on Several Servers, LDNS Assignment to the Best Server, Network Monitoring and LDNS Reassignment.

Now let us consider a situation with several (two or more) web-servers 30, 31, . . . , hosting the same www.site.com, at a moment when a given LDNS server 60 has not selected a specific web-server to which all queries about www.site.com will be directed from this LDNS server. We assume that this choice should be done as a function of "proximity" of the LDNS server 60, and more exactly of its assigned clients 501, 502, . . . , to every web-server (3x). We want to select the "closest" among those web-servers.

This concept of "distance" over the network is typically implemented by the well-known round-trip-time (RTT) characteristic of communications. To measure RTT between two network nodes, a ping packet may be sent from one node to another; this method and its drawbacks were discussed in the "Background" section above.

An alternative method is to measure RTT on "realistic" communications, that is, on those data exchanges, that have been requested by clients and/or performed by servers. These data exchanges over the Internet are typically done using TCP protocol, which has a built-in mechanism for RTT measurement.

So, in order to definitely assign our LDNS server 60 with its clients 500, 501, . . . to the nearest one among the web-servers 30, 31, . . . , we temporarily assign it to one web-server, then to another, and so on until all the web-servers have thus been "scrutinized". During every such assignment period, the ASM of the temporarily assigned web-server, e.g. the ASM 41 of the server 31, measures RTT on TCP communications between the web-server and those clients, which are just being discovered as belonging to the LDNS server 60 according to the method already described in the previous embodiments. Those RTT values are then appended to every "request record" sent by the ASMs to the DMM, and the DMM calculates an average value for all RTTs received from the same ASM. Such an average may be calculated as an arithmetic mean value, or according to any other known statistical method. We assume this average value to be an aggregate distance between the web-server and the "community of clients" of the LDNS server considered, in our example between the server 31 and the clients 500, 501, . . . At the end of the whole scrutiny, when the DMM has collected average RTTs from all the web-servers 30, 31, . . . , it chooses that one among the servers that is nearest to the "community of users" of the LDNS server 60, and assigns it definitely to that LDNS server.

The "temporary assignment" of an LDNS server 60 to a web-server (3x), e.g., to the server 31, means that, first, the ADNS server 10 is instructed (e.g. by the DMM) to answer queries from the LDNS server 60 about www.site.com by providing the standard address 310 of that web-server 31; and second, that the NSM 20 replaces that standard address 310 with any one among the monitoring addresses 410, 411 . . . of the same web-server. A monitoring address may be selected if it is not currently being used in a discovery procedure for another LDNS server. The NSM 20 may maintain a dynamic occupancy table of all monitoring addresses of all the web-servers 30, 31 . . . In a particular case, when this embodiment is built as an enhancement of the first embodiment (and not of the second), this table would contain just one monitoring address per web-server.

If we have, say, 10 web-servers 30, 31, . . . 39 hosting www.site.com, then, even with one monitoring address per web-server (as exemplified on FIG. 1), we are able to perform the above-described LDNS-exploring procedure for 10 LDNS servers simultaneously, say, for LDNS servers 60, 61, . . . , 69. During every assignment period, there would be a 1-to-1 correspondence between those web-servers and LDNS servers; this correspondence would then be modified, e.g. circularly shifted, for the next assignment period. If the assignment period is of 5 minutes, with 1 min security gap, then there will be 10 reassignments in one hour, thus making it possible in one hour to collect RTT values from all 10 web-sites about all 10 LDNS servers, and to make definite assignments for all of them.

If, in addition, we define, as in the second embodiment above-described (FIG. 2), several monitoring addresses for every web-site, preferably an equal quantity of addresses per web-site, then the total performance of our system increases accordingly. For example, if we have 10 web-sites and 10 monitoring addresses for each of them, we are able to explore 100 LDNS servers in parallel, and collect measurement data for all of them in only 1 hour.

Obviously, not every LDNS server would send another query about www.site.com immediately after the TTL of the previous answer has expired, because an LDNS server sends a query not at its own initiative, but only when it has been queried itself by some of its clients, and hasn't found valid information in its cache. Therefore, the whole scrutiny for some of the LDNS servers may take more time than in our calculations above. Consequently, the NSM 20 would better assign free monitoring addresses on a per demand basis rather than in a round robin manner.

We may also observe that there are two logically distinct procedures: the network discovery procedure as described in the first two embodiments, which results in building a correspondence table between LDNS servers and clients assigned to them, and the above-described server-to-client measurement procedure, which results in definitely assigning web-servers to LDNS servers. If the results of the discovery procedure are stored for subsequent use, then the measurement and assignment procedure may be performed for all already known LDNS servers in parallel. In fact, client browsers normally retain any web address received for much longer time than 5 minutes, irrespective of the TTLs we might define in our answers from the ADNS server to the LDNS servers. Suppose we have assigned an LDNS server 60 to, say, web-server 30 for just 5 minutes as a result of its first query to the ADNS server 10, and then reassigned it to another web-server, say 31, for 5 minutes as well as a result of its second query. Then the first client, say 500, whose query to the LDNS server 60 has provoked said first query to ADNS server, may eventually continue to communicate with the web-server 30 for much longer time than just 5 minutes. The same will be true for all other clients having made subsequent queries to the LDNS server 60 during said first 5-minutes interval. The LDNS server will answer those queries from its local cache, without re-issuing another query to the ADNS server. All those clients may thus continue communicating with the web-server 30 after the LDNS server 60 would have already been re-assigned to another web-site 31. The ASMs may be instructed to collect RTT measurement data on all those communications, and to send request records with those RTT values to the DMM. This method introduces yet more parallelism in the operation of the system according to the present invention.

Once an LDNS is assigned to a given web server, say, to the server 30, the ASM 40 of that server may continue to perform distance metering on communications between that server and the clients of this and other LDNS servers. This "network monitoring" function is made possible by the network discovery step that already has been performed. Measurement records are sent to the DMM where they are checked against an already collected database of client-to-LDNS server associations, and aggregate distance values are recalculated for different LDNS servers. This in turn allows dynamic reassignment of an LDNS server to another web server when network distances significantly change (the latter may happen because, e.g., of different network failures, or, inversely, when a new speedy path is added to the network around some server).

The above introduced network monitoring function may in turn have different enhancements and variants. First, the network parameters subject to be collected and analyzed may include, in addition to or in replacement of said network distance (represented by RTT on TCP communications), such other parameters as current path load, packet loss rate etc. For every such parameter an aggregate per LDNS value may be calculated using any appropriate mathematical method, and then regularly updated.

Furthermore, the whole process of collecting fresh values of said parameters by ASMs may be turned on and off (e.g. by the DMM); and said aggregate values may be recalculated for every LDNS either permanently or with some periodicity. Finally, decisions of LDNS reassignments from one web server to another may be taken either when triggered by some of the aggregate parameters getting out of a permitted value range (e.g., packet loss rate becomes too high), or at regular intervals (e.g., once every week).

All these network monitoring processes use previously collected network discovery data, i.e. client-to-LDNS associations. As these associations may also change in time, e.g. when a client changes the LDNS to which it ordinarily sends its queries, a recurrent network discovery may be needed from time to time. This function may also be managed by the DMM.

The above described mechanism, with all its variations, represents therefore a very powerful and flexible method for client-transparent passive dynamic load balancing and network monitoring, distinctively superior to any prior art load balancing methods.

The Fourth Preferred Embodiment: Exploring Several LDNS Servers on the Same Server Using Different Service Names, and Also Exploring the Same LDNS Server on Several Servers in Parallel.

Let us consider now a system according to any of the above-described first, second or third embodiments, where at least some of the ASMs are co-located with more than one web-server (a "bunch" of co-located web-servers); or, equivalently and more practically, where such a "bunch of servers" is represented by a common proxy server, which redirects HTTP-requests from clients to different web-servers according to the web-site name in the request, or by a web hosting server. We will refer to the individual web-servers represented by such a common proxy or hosting server as virtual web servers.

In such a configuration, any one of the addresses of that ASM becomes a common monitoring address for any of the virtual web-servers represented by the common proxy server co-located with the ASM. Our fourth preferred embodiment builds on this particular feature, taking additional benefit from it, as is described hereafter, with reference to FIG. 3.

In FIG. 3, a common proxy server 30, represents multiple web-sites www.site.com, www.site1.com, . . . Assume that an LDNS server 60 queries an ADNS server 10 first for www.site1.com and then, a short time later, for www.site2.com. In replying to the first of these queries, the NSM 20 of that ADNS server may decide to redirect that LDNS server to a monitoring address 400 of the server 30. In replying to the second of these queries, however, the NSM 20 may decide to redirect the same LDNS server to another monitoring address of the same server 30, or leave the answer pointing to the standard address 300 of the server 30, or else, redirect the LDNS server to a monitoring address of some other common proxy server 31 also representing the same service.

For every query handled, the NSM 20 then records the name of the service requested (i.e. of the web-site) along with other information constituting a query record. In this case, the query record has the following fields:
the standard address of the (common proxy) server object of the query,
the IP address of the LDNS server,
the time when the response was sent to it ("a response timestamp"),
the monitoring address used,
and the service (web-site) requested.

Similarly, the ASM 40 records, for every client request arriving at any of its monitoring address(es), a request record additionally containing the name of the service requested (the web-site name). In this case, a request record has the following fields:
the standard address of the (common proxy) server,
the IP address of the LDNS server,
the time when the request was received ("a request timestamp"),
the monitoring address used,
and the service (web-site) requested.

All query records and request records are sent to the DMM, which finds matching pairs and thus discovers client-to-LDNS associations as above described. But now, unlike in the previously described embodiments, the same LDNS server may be simultaneously explored on different monitoring addresses 400, 401, . . . of the same server 30, or even on different monitoring addresses, say 400, 410. . . , of different servers 30, 31, . . .

This distribution of requests from clients of the same LDNS server 60 to monitoring addresses of different servers 30, 31, . . . operates on a per-service rather on a per-client basis. The same client 500 of the LDNS server 60 may therefore send a request for www.site1.com to a server 30, and then a request for www.site2.com to a server 31. Therefore, such a distribution has no acceleration effect on discovering client-to-LDNS associations for one given LDNS server. But instead, it becomes extremely useful for performing a server-to-client measurement and LDNS server assignment procedure. Namely, instead of performing it sequentially, as described in the third embodiment, we are now able to get several measurements in parallel: RTTs from clients of the LDNS server 60 to the server 30 are measured on their requests for www.site1.com, while RTTs from (possibly the same) clients of the same LDNS server 60 to another server 31 are at the same time measured on their requests for www.site2.com.

For example, suppose we have 10 popular web-sites www.site.com, www.site1.com, . . . , all being represented by every one of the common proxy servers 30, 31, . . . Suppose further that an LDNS server 60 has sent to the ADNS server 10, rapidly one after another, a series of queries about all those web-sites. Also suppose that, according to the presently described embodiment, all those queries have been redirected by the NSM 20 with a TTL of 5 minutes to monitoring addresses of different servers. For example, a query for www.site.com may be directed to an address 400 of the server 30, a query for www.site1.com to an address 410 of the server 31 and so on. Then in just a few minutes the DMM will be able to calculate and compare all the aggregate distances between the "community of clients" of the LDNS server 60 and every one of the servers 30, 31, . . . , and make a definite assignment of that LDNS server to the nearest one among those servers.

But there is another, yet more interesting consequence of the method of the present embodiment. Suppose we have several LDNS servers, say 10 LDNS servers 60, 61, . . . to be explored in parallel. Then, for one of them, say for 60, we can redirect its query for www.site.com to the monitoring address 400 of the server 30, a query for www.site1.com to the monitoring address 410 of the server 31 and so on. While for another LDNS server, say for 61, we would redirect its queries in a different manner: a query for www.site.com to the address 410 of the server 31, a query for www.site1.com to the address 420 of the server 32, . . . , finally, a query for www.site9.com to the address 490 of the server 39. In the same way we would rotate redirection of queries for all other LDNS servers.

In this way we would be exploring all 10 LDNS servers on all 10 proxy servers simultaneously. Suppose that, in addition, we have defined multiple monitoring addresses as in the second embodiment; say, 10 different monitoring addresses for every of those common proxy servers 30, 31, . . . Then, with 10 different web-sites each represented by 10 common proxy servers, each having 10 monitoring addresses, we would be able to explore 100 LDNS servers in parallel from all those 10 proxy server locations, and to assign each of them to the nearest proxy server in slightly more than 5 minutes.

If one has an unlimited or very large IP-address range for an application server, then one of the above two aspects of the present embodiment ceases to be of particular interest, as we can then use every time a new address for any new LDNS server presenting itself to the ADNS server. But the other aspect, that of a possibility to explore the same LDNS server simultaneously on several server locations by directing it to different locations when it queries for different services, remains still valid even in this case.

Yet Another Embodiment: Generalization of the Network Discovery Method of the Present Invention Now we will describe yet another embodiment of the present invention, which implements a more generalized form of our network discovery method. Let us consider an NSM just passively reading some information from queries received by an ADNS server and from answers of the latter, to produce query records as in any of the above embodiments. But, unlike in the above embodiments, such an NSM would not replace server addresses generated by the ADNS server in its answers, neither would it instruct the ADNS server to choose one such address instead of another. Accordingly, in the present embodiment we will not distinguish between standard addresses and monitoring addresses of application servers; we will simply assume that every server has one or several IP-addresses, all equivalent. An ASM, on its side, would produce request records and send them to the DMM exactly as in the above embodiments.

Under these assumptions, the NSM has no control over the validity period overlapping in answers from the ADNS server to different LDNS servers. Nevertheless, the DMM collecting query records from the NSM and request records from ASMs is still able to discover associations between clients and LDNS servers. Such a "generalized discovery algorithm" may look as follows:

For a request record just received, try to find a "potentially matching" query record such that:

1) the application server address is the same in both records ("address match condition");

2) the timestamp in the request record is within the specified validity period starting at the moment of time expressed by the timestamp in the query record ("timestamp match condition");

3) if the service name is specified in both the query record and the request record (according to the specific feature of the above fourth embodiment), then it must be the same ("service name match condition"); otherwise, if it is not specified in at least one among the two records, the service name match condition is considered to be satisfied (because absence of specific service name in a record means "may be any service name").

If, for a given request record, exactly one such "potentially matching" query record is found, then such a unique query record forms with the request record a matching pair of records, from which an association may be certainly deduced between the client address (from the request record) and the LDNS address (from the query record). Otherwise, i.e. when several query records have been issued in an overlapped way, so that the given request record could correspond to any one of them, we should not consider that request record as providing any association information.

One could easily see that the "service name match condition" as above described covers both the case when the service name is systematically recorded by the NSM and the ASMs (as in the fourth embodiment), as well as the case when it is not registered (as in the first three embodiments). Also, the "specified validity period" in the above timestamp condition may be either a system constant, or a variable recorded with every query record; the algorithm takes account of both cases.

The above described algorithm works for any number of ASMs concurrently reporting to the same DMM, and for any number of addresses (1 or several) of any application server. Moreover, if there are several ADNS servers, which concurrently use the same common set of application server addresses for answering queries from different LDNS servers, then even in this case our algorithm works properly, provided that the NSMs of all ADNS servers report to the same DMM.

One of ordinary skill in the art can easily see that all the above described preferred embodiments represent different ways of enhancing this general network discovery mechanism and rendering it more efficient. Moreover, further enhancements and variants of the algorithm itself, and further enhanced or modified embodiments, may easily be devised by those skillful in the art, without departing from the scope and spirit of the present invention.

What is claimed:

1. In a communication network comprising:
   a plurality of local name servers, each of the local name servers being capable of answering name-to-address resolution queries by using temporarily stored information or by further querying other name servers,
   at least one application server having at least one application server address and being capable of receiving requests for at least one service and performing the at least one service, wherein the at least one service has a service name,
   a plurality of clients, each of the clients being associated with at least one of the local name servers, and being capable of querying the at least one associated local name server for an address of the at least one application server, to receive from the at least one associated local name server an answer specifying an address of the at least one application server, and to send a request for the at least one service to the at least one application server having the address specified in the answer,
   and at least one authoritative name server, the at least one authoritative name server being capable of providing answers to name-to-address resolution queries from the local name servers, the content of every answer having a validity period,
   a method for discovering associations between the clients and the local name servers, comprising the steps of:
   producing a query record concerning a query from one of the local name servers received by the at least one authoritative name server and an answer to the query, the query record including:
      a first application server identifier of the at least one application server that is the answer to the query,
      a response timestamp expressing when the answer was issued,
      a validity period defined for the first application server identifier, and
      a local name server address of the local name server from which the query was received,
   producing a request record concerning a service request issued by one of the clients for a service and received by the at least one application server, the request record including:
      a second application server identifier of the application server that received the service request,
      a request timestamp expressing when the service request was received, and
      a client address of the client that issued the service request; and
   comparing query records and request records to find matching pairs of query records and request records, and associating the local name server address in the matching query record to the client address in the matching request record, a matching pair being defined as a first-identified pair of one of the query records and one of the request records for which the first application server identifier matches the second application server identifier and the response timestamp matches the request timestamp.

2. The method as recited in claim 1, wherein the query record further includes a monitoring address for the application server that is the answer to the query and the request record further comprises a monitoring address for the application server that received the service request.

3. The method of claim 2, wherein a matching pair is further defined as satisfying a condition that the monitoring address for the application server that is the answer to the query in the query record matches the monitoring address for the application server that received the service request in the request record.

4. The method of claim 1, wherein the query record further includes a name of a service provided by the at least one application server.

5. The method of claim 1, wherein the request record further includes a name of a service provided by the at least one application server.

6. The method of claim 1, further comprising:
   assigning a monitoring address to the at least one application server based which of the local name servers issued a domain name resolution query for the at least one service of the at least one application server.

7. The method of claim 1, further comprising:
   measuring round trip time between one of the clients and the at least one application server; and
   including the measured round trip time in the request record.

8. The method of claim 7, further comprising:
   using the measured round trip time in the request record to determine which of the local name servers to assign to the at least one application server.

9. A system for discovering associations between clients and local name servers, comprising
   at least one name server monitor, the at least one name server monitor being associated with an authoritative name server and configured to modify an answer to a domain name resolution query from at least one local name server, the modified answer including a monitoring address for an application server, and further configured to create query records,
   wherein each of the query records includes a local name server identifier, an application server identifier, and a response timestamp;
   at least one application server monitor, the at least one application server monitor being associated with an application server and configured to receive a request from a client and pass the request to the associated application server, and further configured to create request records,
   wherein each of the request records includes a client identifier, an application server identifier of the associated application server, and a request timestamp; and
   at least one discovery and monitoring manager configured to compare the query records and the request records to discover the associations between the clients and the local name servers.

10. The system of claim 9, wherein the application server associated with the at least one application server monitor is assigned a plurality of monitoring addresses and the at least one name server monitor is further configured to modify the answer to a domain name resolution query to include one of the plurality of monitoring addresses based on the local name server identifier.

11. The system of claim 9, wherein the at least one name server monitor is co-located with the authoritative name server.

12. The system of claim 9, wherein the at least one application server monitor is co-located with the application server.

13. The system of claim 9, wherein the at least one discovery and monitoring manager is co-located with the at least one name server monitor.

14. The system of claim 9, wherein the at least one application server monitor is further configured to measure round trip times between the associated application server and clients and to include the measured round trip times in the request records.

15. The system of claim 14, wherein the discovery and monitoring manager is further configured to use the measured round trip times to assign a local name server to the associated application server.

16. A method for associating clients and local name servers, comprising:
   receiving a domain name resolution query from a local name server for an address of an application server;
   responding to the domain name resolution query with an answer that includes a monitoring address for the application server;
   creating a query record that includes an application server identifier that uniquely identifies the application server, the monitoring address for the application server, a local name server identifier for the local name server and a response timestamp;
   receiving a request for content from a client, the request being addressed to the monitoring address for the application server;
   creating a request record that includes the application server identifier, the monitoring address for the application server, a client identifier that uniquely identifies the client, and a request timestamp; and
   associating the client with the local name server when the query record and the request record match, wherein the query record and the request record match when the application server identifier in the query record matches the application server identifier in the request record, the monitoring address in the query record matches the monitoring address in the request record, and the response timestamp matches the request timestamp.

17. The method of claim 16, wherein the query record further includes a name of a service provided by the application server and the request record further includes a name of a service provided by the application server.

18. The method of claim 16, further comprising:
   measuring round trip time between the client and the application server; and
   including the measured round trip time in the request record.

19. The method of claim 18, further comprising:
   using the measured round trip time in the request record to determine whether to assign the local name server to the application server.

20. The method of claim 16, wherein the monitoring address for the application server included in the answer to the domain name resolution query is selected from a plurality of monitoring address available for temporary assignment to the application server.

* * * * *